United States Patent
Ju et al.

(10) Patent No.: US 10,735,323 B2
(45) Date of Patent: Aug. 4, 2020

(54) SERVICE TRAFFIC ALLOCATION METHOD AND APPARATUS

(71) Applicant: Huawei Technologies Co., Ltd., Shenzhen (CN)

(72) Inventors: Wenbin Ju, Nanjing (CN); Xuejun Yao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/045,373

(22) Filed: Jul. 25, 2018

(65) Prior Publication Data

US 2018/0331955 A1 Nov. 15, 2018

Related U.S. Application Data

(63) Continuation of application No. PCT/CN2017/070658, filed on Jan. 9, 2017.

(30) Foreign Application Priority Data

Jan. 26, 2016 (CN) .......................... 2016 1 0051922

(51) Int. Cl.
*H04L 12/801* (2013.01)
*H04L 12/709* (2013.01)
(Continued)

(52) U.S. Cl.
CPC ........ *H04L 47/115* (2013.01); *H04L 12/4641* (2013.01); *H04L 41/065* (2013.01);
(Continued)

(58) Field of Classification Search
CPC . H04L 12/4641; H04L 43/08; H04L 43/0852; H04L 43/0864; H04L 43/087;
(Continued)

(56) References Cited

U.S. PATENT DOCUMENTS 6,868,094 B1 * 3/2005 Bordonaro .......... H04L 41/5009
370/516
7,154,858 B1 * 12/2006 Zhang ..................... H04L 43/00
370/252
(Continued)

FOREIGN PATENT DOCUMENTS

CN 101335689 A 12/2008
CN 102118319 A 7/2011
(Continued)

OTHER PUBLICATIONS

Alizadeh, M., et al., "CONGA: Distributed Congestion-Aware Load Balancing for Datacenters," XP058053862, Aug. 17, 2014, pp. 503-514.
(Continued)

*Primary Examiner* — Eric Nowlin
(74) *Attorney, Agent, or Firm* — Conley Rose, P.C.

(57) ABSTRACT

A service traffic allocation method and apparatus, where first leaf node repeatedly sends a probe packet through each physical link of multiple physical links of the first leaf node coupled to a backbone node, for each physical link, the first leaf node receives a returned response packet through the physical link, where each response packet is returned by a second leaf node after a probe packet that is sent through a physical link arrives at the second leaf node, for each path, the first leaf node calculates a transmission parameter of the path according to multiple response packets received on the path to obtain the transmission parameter of each path, and the first leaf node allocates to-be-transmitted service traffic to the physical links according to the transmission parameter of each path.

16 Claims, 5 Drawing Sheets

(51) Int. Cl.

| | | |
|---|---|---|
| *H04L 12/24* | (2006.01) | |
| *H04L 12/721* | (2013.01) | |
| *H04L 12/803* | (2013.01) | |
| *H04L 12/46* | (2006.01) | |
| *H04L 12/751* | (2013.01) | |
| *H04L 12/891* | (2013.01) | |
| *H04L 29/12* | (2006.01) | |

(52) U.S. Cl.
CPC .............. *H04L 41/12* (2013.01); *H04L 45/02* (2013.01); *H04L 45/245* (2013.01); *H04L 45/70* (2013.01); *H04L 47/125* (2013.01); *H04L 47/41* (2013.01); *H04L 61/2007* (2013.01)

(58) Field of Classification Search
CPC . H04L 43/0876; H04L 43/0858; H04L 43/10; H04L 43/106; H04L 45/02; H04L 45/245; H04L 47/115; H04L 47/41; H04L 61/2007
See application file for complete search history.

(56) References Cited

U.S. PATENT DOCUMENTS

| | | | |
|---|---|---|---|
| 8,203,954 B1 | 6/2012 | Patel et al. | |
| 8,675,502 B2* | 3/2014 | Blair | H04L 43/0858 370/248 |
| 9,806,835 B2* | 10/2017 | Mizrahi | H04J 3/0602 |
| 9,898,317 B2* | 2/2018 | Nakil | G06F 9/45558 |
| 10,056,999 B2* | 8/2018 | Zeng | H04J 3/0667 |
| 10,205,547 B2* | 2/2019 | Mizrahi | H04J 3/0602 |
| 10,218,629 B1* | 2/2019 | An | H04L 47/283 |
| 2001/0034853 A1 | 10/2001 | Takatama et al. | |
| 2009/0190482 A1* | 7/2009 | Blair | H04L 43/0858 370/250 |
| 2010/0149979 A1 | 6/2010 | Denecheau et al. | |
| 2012/0151090 A1 | 6/2012 | Nakashima et al. | |
| 2013/0259049 A1* | 10/2013 | Mizrahi | H04J 3/0602 370/392 |
| 2014/0016470 A1 | 1/2014 | Li | |
| 2015/0156119 A1 | 6/2015 | Bello et al. | |
| 2015/0244617 A1* | 8/2015 | Nakil | G06F 9/45558 709/224 |
| 2017/0085485 A1* | 3/2017 | Vanini | H04L 47/125 |
| 2017/0366287 A1* | 12/2017 | Zeng | H04J 3/0667 |
| 2018/0077064 A1* | 3/2018 | Wang | H04L 47/125 |
| 2018/0173557 A1* | 6/2018 | Nakil | G06F 9/45558 |
| 2018/0198696 A1* | 7/2018 | Zheng | H04W 24/00 |
| 2018/0367462 A1* | 12/2018 | Tang | H04L 47/25 |
| 2019/0140956 A1* | 5/2019 | Shen | H04L 45/02 |

FOREIGN PATENT DOCUMENTS

| | | | | |
|---|---|---|---|---|
| CN | 103825839 | A | | 5/2014 |
| CN | 104092628 | A | | 10/2014 |
| CN | 104363181 | A | | 2/2015 |
| CN | 104796346 | A | | 7/2015 |
| CN | 109691037 | A * | 4/2019 | ............ H04L 47/115 |
| EP | 952702 | A2 * | 4/1999 | ............ H04L 12/44 |
| JP | 2001298482 | A | | 10/2001 |
| JP | 2005057514 | A | | 3/2005 |
| JP | 2012080394 | A | | 4/2012 |
| JP | 2012124720 | A | | 6/2012 |
| JP | 2014170988 | A | | 9/2014 |
| WO | WO-2018045620 | A1 * | 3/2018 | ............ H04L 47/115 |

OTHER PUBLICATIONS

Foreign Communication From a Counterpart Application, European Application No. 17743560.9, Extended European Search Report dated Nov. 20, 2018, 7 pages.

Machine Translation and Abstract of Japanese Publication No. JP2005057514, Mar. 3, 2005, 72 pages.

Machine Translation and Abstract of Japanese Publication No. JP2014170988, Sep. 18, 2014, 36 pages.

Foreign Communication From a Counterpart Application, Japanese Application No. 2018-557175, Japanese Office Action dated May 28, 2019, 4 pages.

Foreign Communication From a Counterpart Application, Japanese Application No. 2018-557175, English Translation of Japanese Office Action dated May 28, 2019, 4 pages.

Watanabe, M., "Load Balancing Function," Toshiba Technology Publication Collection, Japan, Toshiba Corporation, Jan. 21, 2002, vol. 20-2, 13 pages.

Partial English Translation of Watanabe, M., "Load Balancing Function," Toshiba Technology Publication Collection, Japan, Toshiba Corporation, Jan. 21, 2002, vol. 20-2, 2 pages.

Foreign Communication From a Counterpart Application, Chinese Application No. 2018-557175, Chinese Office Action dated May 28, 2019, 4 pages.

Foreign Communication From a Counterpart Application, Chinese Application No. 2018-557175, English Translation of Chinese Office Action dated May 28, 2019, 4 pages.

Machine Translation and Abstract of Chinese Publication No. CN101335689, Dec. 31, 2008, 14 pages.

Machine Translation and Abstract of Chinese Publication No. CN104092628, Oct. 8, 2014, 19 pages.

Foreign Communication From a Counterpart Application, Chinese Application No. 201610051922.4, Chinese Office Action dated Apr. 22, 2019, 7 pages.

Machine Translation and Abstract of Chinese Publication No. 103825839, May 28, 2014, 17 pages.

Machine Translation and Abstract of Chinese Publication No. 104363181, Feb. 18, 2015, 18 pages.

Machine Translation and Abstract of Chinese Publication No. 104796346, Jul. 22, 2015, 22 pages.

Foreign Communication From a Counterpart Application, PCT Application No. PCT/CN2017/070658, English Translation of International Search Report dated Mar. 29, 2017, 2 pages.

Machine Translation and Abstract of Japanese Publication No. JP2012080394, Apr. 19, 2012, 30 pages.

Foreign Communication From a Counterpart Application, Chinese Application No. 201610051922.4, Chinese Office Action dated Oct. 12, 2019, 5 pages.

Foreign Communication From a Counterpart Application, Japanese Application No. 2018-557175, Japanese Notice of Allowance dated Oct. 8, 2019, 3 pages.

* cited by examiner

SERVICE TRAFFIC ALLOCATION METHOD AND APPARATUS

CROSS-REFERENCE TO RELATED APPLICATIONS

This application is a continuation of International Patent Application No. PCT/CN2017/070658 filed on Jan. 9, 2017, which claims priority to Chinese Patent Application No. 201610051922.4 filed on Jan. 26, 2016. The disclosures of the aforementioned applications are hereby incorporated by reference in their entireties.

TECHNICAL FIELD

The present disclosure relates to the communications field, and in particular, to a service traffic allocation method and apparatus.

BACKGROUND

In a data center network using a layer 2 leaf-spine topology architecture, to improve reliability and service quality of the data center network, multiple physical links are usually configured between a switch and a server. To enable service traffic to be simultaneously transmitted on the multiple physical links, the multiple physical links are usually aggregated into one logical link. The logical link may be referred to as a link aggregation group (LAG).

To prevent a packet from being discarded due to congestion on some physical links in the data center network, the service traffic usually needs to be evenly allocated to each physical link in the LAG. As shown in FIG. 1, it is assumed that a server 1 needs to send a packet to a server 5 using a leaf node 2, a backbone node 3, and a leaf node 4. After the leaf node 2 receives the packet sent by the server 1, if the leaf node 2 finds, in a flow table stored in the leaf node 2, an entry (including an identifier of the service flow, an outbound, and a timestamp at which a first packet of the service flow arrives at the leaf node 2) corresponding to the service flow to which the packet belongs, the leaf node 2 sends the packet using the outbound interface in the entry. If the leaf node 2 has not found the entry in the flow table, the leaf node 2 may select an optimal physical link (for example, a physical link having lowest bandwidth utilization and a lowest queue occupation rate) for the packet according to bandwidth utilization and a queue length of a physical link supported by the leaf node 2, send the packet using an outbound interface of the physical link, and add, to the foregoing flow table, the entry corresponding to the service flow to which the packet belongs.

However, in the foregoing service traffic allocation method, the leaf node 2 can select, only according to the bandwidth utilization and the queue length of the physical link of the leaf node 2, an optimal physical link for the packet that needs to be forwarded. That is, the leaf node 2 can ensure that only service traffic on physical links of the leaf node 2 is balanced, and the packet further needs to be sent to the leaf node 4 through the backbone node 3. Therefore, when a physical link between the backbone node 3 and the leaf node 4 is congested, the packet may be lost on the physical link between the backbone node 3 and the leaf node 4.

SUMMARY

Embodiments of the present disclosure provide a service traffic allocation method and apparatus, to ensure that service traffic on paths between a source node and a destination node is balanced, thereby ensuring that a packet is not lost.

To achieve the foregoing objectives, the following technical solutions are used in the embodiments of the present disclosure.

According to a first aspect, an embodiment of the present disclosure provides a service traffic allocation method. The allocation method includes repeatedly sending, by a first leaf node, a probe packet through each of multiple physical links of the first leaf node that are connected to a backbone node, for each physical link, receiving, by the first leaf node, a returned response packet through the physical link, where each response packet is returned by a second leaf node after a probe packet that is sent through a physical link arrives at the second leaf node, for each path, calculating, by the first leaf node, a transmission parameter of the path according to multiple response packets received on the path to obtain the transmission parameter of each path, where response packets received on a same path include a same path identifier, each path includes at least two physical links, and the multiple physical links belong to different paths, and allocating, by the first leaf node, to-be-transmitted service traffic to the multiple physical links according to the transmission parameter of each path.

According to the service traffic allocation method provided in this embodiment of the present disclosure, the first leaf node may detect transmission parameters of all paths between the first leaf node and the second leaf node by sending the probe packet. Therefore, the first leaf node then allocates the to-be-transmitted service traffic according to the transmission parameters of the paths. This not only can ensure that service traffic on the physical links of the first leaf node is balanced, but also can ensure that service traffic on other physical links on each of the paths is balanced, thereby ensuring that service traffic on paths between a source node (for example, the first leaf node) and a destination node (for example, the second leaf node) is balanced, and further ensuring that a packet is not lost.

Optionally, in an embodiment of the present disclosure, allocating, by the first leaf node, to-be-transmitted service traffic to the multiple physical links according to the transmission parameter of each path includes determining, by the first leaf node, a service traffic allocation ratio of each path according to the transmission parameter of each path, and allocating, by the first leaf node, the to-be-transmitted service traffic to the multiple physical links according to the service traffic allocation ratio of each path.

The service traffic allocation ratios determined by the first leaf node are service traffic allocation ratios of all the paths between the first leaf node and the second leaf node (each path includes multiple physical links). Therefore, when transmitting the to-be-transmitted service traffic, the first leaf node may allocate corresponding to-be-transmitted service traffic to the multiple physical links of the first leaf node according to the service traffic allocation ratios. In this way, it not only can ensure that service traffic on each physical link of the first leaf node is balanced, but also can ensure that service traffic on other physical links on each of all the paths between the first leaf node and the second leaf node is also balanced, further preventing a packet from being lost during transmission from the first leaf node to the second leaf node.

Optionally, in an embodiment of the present disclosure, the transmission parameter of the path includes at least one of latency of the path, jitter of the path, or a packet loss rate of the path.

For example, it is assumed that there are multiple paths between the first leaf node and the second leaf node. When the first leaf node calculates transmission parameters of the multiple paths, the transmission parameter calculated by the first leaf node is the same for each path. For example, the first leaf node separately calculates a same type of transmission parameters for the multiple paths.

Optionally, in an embodiment of the present disclosure, before calculating, by the first leaf node, a transmission parameter of the path according to multiple response packets received on the path, the method further includes determining, by the first leaf node according to path identifiers included in received response packets, the response packets received on the path, to obtain the multiple response packets received on the path, and calculating, by the first leaf node, a transmission parameter of the path according to multiple response packets received on the path includes calculating, by the first leaf node, the transmission parameter of the path according to packet characteristics of the multiple response packets received on the path.

Optionally, in an embodiment of the present disclosure, a packet characteristic of each of the multiple response packets received on the path includes an identifier of the path, a sequence number of the response packet, a source Internet Protocol (IP) address of the response packet, a destination IP address of the response packet, a layer 4 source port number of the response packet, a layer 4 destination port number of the response packet, a time at which the response packet arrives at the first leaf node, and a time at which a probe packet corresponding to the response packet leaves the first leaf node.

A path identifier included in each response packet may be used to identify a path using which the response packet is transmitted. For example, the path identifier may include an interface name of a device (for example, the first leaf node in this embodiment of the present disclosure) sending a probe packet corresponding to the response packet or an interface identifier of the device, and a hash value. The hash value may be used to represent another physical link other than the physical link between the first leaf node and the backbone node in the path. The hash value is calculated, after network deployment is completed, by the first leaf node using a hash algorithm and according to all the paths that are between the first leaf node and the second leaf node and that are traversed by the first leaf node.

A response packet received on a path may be used to determine a transmission parameter of the path. Therefore, the first leaf node may calculate the transmission parameter of the path separately according to the packet characteristics of the multiple response packets that are received on each path and that are determined by the first leaf node. In this way, after performing calculation for each path, the first leaf node may obtain the transmission parameter of each path.

Optionally, in an embodiment of the present disclosure, determining, by the first leaf node, a service traffic allocation ratio of each path according to the transmission parameter of each path includes quantizing, by the first leaf node, the transmission parameter of each path, and determining, by the first leaf node, the service traffic allocation ratio of each path according to the quantized transmission parameter of each path.

In this embodiment of the present disclosure, the first leaf node quantizes the transmission parameter of each path, and then the first leaf node determines the service traffic allocation ratio of each path according to the quantized transmission parameter of each path in order to simplify a process of determining the service traffic allocation ratio, and reduce implementation complexity.

Optionally, in an embodiment of the present disclosure, the method for determining, by the first leaf node, the service traffic allocation ratio of each path according to the quantized transmission parameter of each path may be implemented in either of the following manners.

(1) The first leaf node uses a path as a unit, and adds up quantized transmission parameters of each path to obtain a total transmission parameter of each path. Then, the first leaf node determines the service traffic allocation ratio of each path according to the total transmission parameter of each path.

(2) The first leaf node uses a path as a unit, and splices 3 bits of each quantized transmission parameter of each path into one sequence, and a value of the sequence may represent a total transmission parameter of each path. Then, the first leaf node determines the service traffic allocation ratio of each path according to the total transmission parameter of each path.

According to the foregoing two manners of the method for determining the service traffic allocation ratio, the service traffic allocation ratio of each path can be determined more flexibly and more conveniently, thereby flexibly and conveniently implementing the service traffic allocation method provided in this embodiment of the present disclosure.

Optionally, in an embodiment of the present disclosure, the first leaf node may repeat the foregoing service traffic allocation method. In this way, the first leaf node can determine in real time the transmission parameters of all the paths between the first leaf node and the second leaf node. Therefore, accuracy of allocating, by the first leaf node, the to-be-transmitted service traffic to the multiple physical links of the first leaf node according to the transmission parameters can be improved.

According to a second aspect, an embodiment of the present disclosure provides a service traffic allocation apparatus, the allocation apparatus is a first leaf node, and the allocation apparatus includes a sending unit configured to repeatedly send a probe packet through each of multiple physical links of the first leaf node that are connected to a backbone node, a receiving unit configured to, for each physical link, receive a returned response packet through the physical link, where each response packet is returned by a second leaf node after a probe packet that is sent through a physical link arrives at the second leaf node, a calculation unit configured to, for each path, calculate a transmission parameter of the path according to multiple response packets that are received on the path by the receiving unit to obtain the transmission parameter of each path, where response packets received on a same path include a same path identifier, each path includes at least two physical links, and the multiple physical links belong to different paths, and an allocation unit configured to allocate to-be-transmitted service traffic to the multiple physical links according to the transmission parameter of each path that is calculated by the calculation unit.

This embodiment of the present disclosure provides a service traffic allocation apparatus. The allocation apparatus is the first leaf node, and the first leaf node may detect transmission parameters of all paths between the first leaf node and the second leaf node by sending the probe packet. Therefore, the first leaf node then allocates the to-be-transmitted service traffic according to the transmission parameters of the paths. This not only can ensure that service traffic on the physical links of the first leaf node is balanced, but also can ensure that service traffic on other physical links on each of the paths is balanced, thereby ensuring that service traffic on paths between a source node (for example, the first leaf node) and a destination node (for example, the second leaf node) is balanced, and further ensuring that a packet is not lost.

Optionally, the allocation unit is configured to determine a service traffic allocation ratio of each path according to the transmission parameter of each path that is calculated by the calculation unit, and allocate the to-be-transmitted service traffic to the multiple physical links according to the service traffic allocation ratio of each path.

Optionally, the transmission parameter of the path includes at least one of latency of the path, jitter of the path, or a packet loss rate of the path.

Optionally, the allocation apparatus further includes a determining unit, the determining unit is configured to, before the calculation unit calculates the transmission parameter of the path according to the multiple response packets received on the path, determine, according to path identifiers included in response packets received by the receiving unit, the response packets received on the path, to obtain the multiple response packets received on the path, and the calculation unit is configured to calculate the transmission parameter of the path according to packet characteristics of the multiple response packets that are received on the path and that are determined by the determining unit.

Optionally, a packet characteristic of each of the multiple response packets that are received on the path by the receiving unit includes an identifier of the path, a sequence number of the response packet, a source IP address of the response packet, a destination IP address of the response packet, a layer 4 source port number of the response packet, a layer 4 destination port number of the response packet, a time at which the response packet arrives at the first leaf node, and a time at which a probe packet corresponding to the response packet leaves the first leaf node.

Optionally, the allocation unit is configured to quantize the transmission parameter of each path that is calculated by the calculation unit, and determine the service traffic allocation ratio of each path according to the quantized transmission parameter of each path.

For detailed description about the technical effects of the various optional manners of the foregoing second aspect, refer to related description about the technical effects of the corresponding various optional manners of the foregoing first aspect. Details are not described herein again.

According to a third aspect, an embodiment of the present disclosure provides a service traffic allocation apparatus, the allocation apparatus is a first leaf node, the first leaf node is a switch, and the switch includes a processor, an interface circuit, a memory, and a system bus, and the memory is configured to store a computer program instruction, the processor, the interface circuit, and the memory are connected to each other using the system bus, and when the switch runs, the processor executes the computer program instruction stored in the memory such that the switch executes the allocation method according to any one of the first aspect, or the various optional manners of the foregoing first aspect.

The embodiments of the present disclosure provide a service traffic allocation apparatus. The allocation apparatus is the first leaf node, the first leaf node is the switch, and the switch may detect transmission parameters of all paths between the switch and another switch by sending a probe packet. Therefore, the switch then allocates to-be-transmitted service traffic according to the transmission parameters of the paths. This not only can ensure that service traffic on physical links of the switch is balanced, but also can ensure that service traffic on other physical links on each of the paths is balanced, thereby ensuring that service traffic on paths between the switch and another switch is balanced, and further ensuring that a packet is not lost.

BRIEF DESCRIPTION OF DRAWINGS

To describe the technical solutions in the embodiments of the present disclosure or in the other approaches more clearly, the following briefly describes the accompanying drawings required for describing the embodiments or the other approaches.

DESCRIPTION OF EMBODIMENTS

The character "I" in this specification generally indicates an "or" relationship between the associated objects. For example, A/B may be understood as A or B.

In the specification and claims of the present disclosure, the terms "first" and "second" are intended to distinguish between different objects but do not indicate a particular order of the objects. For example, a first leaf node and a second leaf node are used to distinguish different leaf nodes, but not used to describe a characteristic order of leaf nodes.

In descriptions of the present disclosure, "multiple" means two or more, unless stated otherwise. For example, multiple physical links indicate two or more physical links.

In addition, the terms "including," "having," or any other variant thereof mentioned in descriptions of the present disclosure, are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device.

In addition, in the embodiments of the present disclosure, the word "exemplary" or "for example" is used to represent giving an example, an illustration, or a description. Any embodiment or design scheme described as "exemplary" or "for example" in this application should not be explained as being more preferred or having more advantages than another embodiment or design scheme. Exactly, use of the word "exemplary" or "example" or the like is intended to present a concept in a specific manner.

A path mentioned in the following embodiments of the present disclosure is a network path. For example, a path between the first leaf node and the second leaf node is a network path between the first leaf node and the second leaf node.

The following clearly describes the technical solutions in the embodiments of the present disclosure with reference to the accompanying drawings in the embodiments of the present disclosure. The described embodiments are merely some but not all of the embodiments of the present disclosure.

A service traffic allocation method provided in the embodiments of the present disclosure may be applied to a data center network. The data center network may be a data center network having a layer 2 leaf-spine topology architecture, the data center network may be a data center network having a core-aggregation-access topology architecture, or may be another data center network having a more complex topology architecture. This is not limited in the embodiments of the present disclosure.

Figure 1:
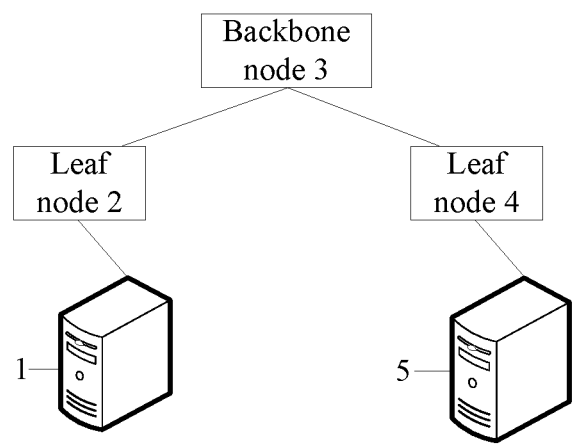
FIG. 1 is a schematic architectural diagram of a data center network.
Figure 2:
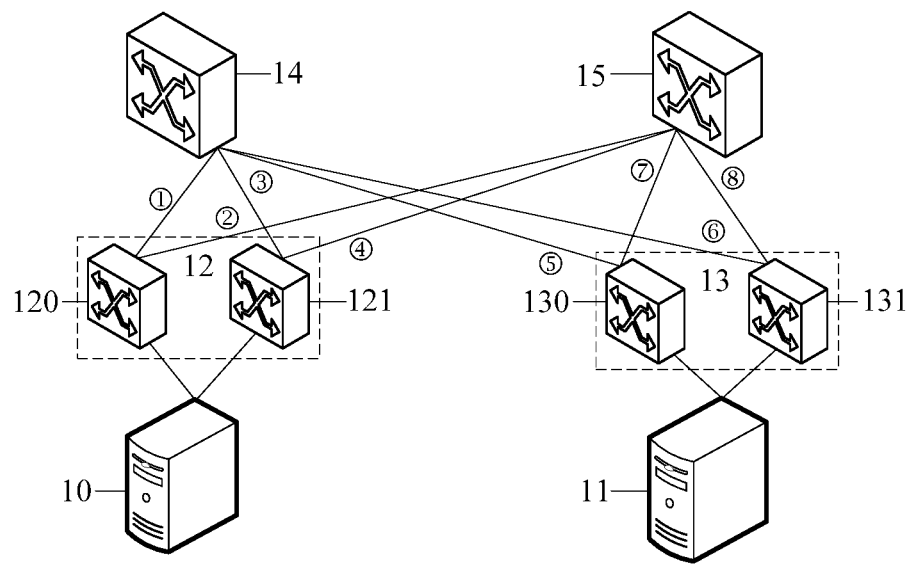
FIG. 2 is a schematic architectural diagram of a data center network according to an embodiment of the present disclosure.

For example, FIG. 2 shows a data center network having a layer 2 leaf-spine topology architecture. For ease of description, in FIG. 2, an example in which the data center network includes two servers (which are respectively a server 10 and a server 11), two leaf nodes (which are respectively a leaf node 12 and a leaf node 13), and two backbone nodes (which are respectively a backbone node 14 and a backbone node 15) is merely used for exemplary description.

In the data center network shown in FIG. 2, to enable the data center network to support balance of service traffic, usually multiple physical links between nodes may be aggregated into one logical link, that is, aggregated into a LAG (for example, as shown in FIG. 2, a physical link ①, a physical link ②, a physical link ③, and a physical link ④ form a LAG, and a physical link ⑤, a physical link ⑥, a physical link ⑦, and a physical link ⑧ form a LAG). It should be noted that, in the embodiments of the present disclosure, an example in which multiple physical links form a LAG is merely used for exemplary description. In actual application, the multiple physical links may form equal cost multipath routing (ECMP) or unequal cost multipath routing (UCMP). This is not described in detail in the embodiments of the present disclosure.

As shown in FIG. 2, to ensure reliability and service quality of the data center network, usually a leaf node may be a cluster or a stack including multiple access switches. For example, the leaf node 12 is a cluster or a stack including a switch 120 and a switch 121, and the leaf node 13 is a cluster or a stack including a switch 130 and a switch 131. In this case, the server 10 and the leaf node 12 may be connected to each other using two physical links (one physical link serves as an active physical link and the other physical link serves as a standby physical link, or a LAG load sharing manner is used for the two physical links). The server 11 and the leaf node 13 may also be similarly connected to each other using two physical links. When an active physical link between a server and a leaf node is faulty, a to-be-transmitted service may be switched to a standby physical link for transmission in order to ensure continuity of service transmission. The leaf node 12 is connected to the backbone node 14 and the backbone node 15 using multiple physical links. The leaf node 13 is also connected to the backbone node 14 and the backbone node 15 using multiple physical links. When the server 10 needs to send service traffic to the server 11, the service traffic needs to be forwarded and shared by the leaf node 12, the backbone node 14 or the backbone node 15, and the leaf node 13. For example, after the leaf node 12 receives the service traffic sent by the server 10, the leaf node 12 may need to allocate the service traffic to different paths for transmission. Each path includes multiple physical links through which the service traffic needs to pass from the leaf node 12 to the leaf node 13.

For example, in FIG. 2, it is assumed that a physical link between the server 10 and the switch 120 in the leaf node 12 is an active physical link. When the server 10 sends service traffic to the leaf node 12 through the active physical link, because each leaf node is connected to two backbone nodes using multiple physical links, there are multiple paths between the leaf node 12 and the leaf node 13. The multiple paths are respectively as follows.

Path 1: the switch 120 in the leaf node 12—the backbone node 14—a switch 130 in the leaf node 13 (that is, the physical link ①+the physical link ⑤ in FIG. 2);

Path 2: the switch 120 in the leaf node 12—the backbone node 14—a switch 131 in the leaf node 13 (that is, the physical link ①+the physical link ⑥ in FIG. 2);

Path 3: the switch 120 in the leaf node 12—the backbone node 15—the switch 130 in the leaf node 13 (that is, the physical link ②+the physical link ⑦ in FIG. 2); and Path 4: the switch 120 in the leaf node 12—the backbone node 15—the switch 131 in the leaf node 13 (that is, the physical link ②+the physical link ⑧ in FIG. 2).

A person skilled in the art may understand that when a physical link between the server 10 and the switch 121 in the leaf node 12 is an active physical link, and the server 10 sends service traffic to the leaf node 12 through the active physical link, the multiple paths between the leaf node 12 and the leaf node 13 are respectively as follows.

Path 5: the switch 121 in the leaf node 12—the backbone node 14—the switch 130 in the leaf node 13 (that is, the physical link ③+the physical link ⑤ in FIG. 2);

Path 6: the switch 121 in the leaf node 12—the backbone node 14—the switch 131 in the leaf node 13 (that is, the physical link ③+the physical link ⑥ in FIG. 2);

Path 7: the switch 121 in the leaf node 12—the backbone node 15—the switch 130 in the leaf node 13 (that is, the physical link ④+the physical link ⑦ in FIG. 2); and Path 8: the switch 121 in the leaf node 12—the backbone node 15—the switch 131 in the leaf node 13 (that is, the physical link ④+the physical link ⑧ in FIG. 2).

In FIG. 2, each path between the leaf node 12 and the leaf node 13 includes two (or multiple in actual application) physical links, and in the other approaches, the leaf node 12 can select, only according to bandwidth utilization and queue lengths of physical links of the leaf node 12, an optimal physical link for a packet in service traffic that needs to be forwarded. Therefore, the leaf node 12 can only ensure that service traffic on the physical links of the leaf node 12 is balanced. When a physical link between the backbone node 14 and the leaf node 13 or between the backbone node 15 and the leaf node 13 is congested, the packet in the service traffic may be lost on the path from the leaf node 12 to the leaf node 13 during transmission.

To resolve the problem, an embodiment of the present disclosure provides a service traffic allocation method. In the allocation method, a first leaf node sends a probe packet to a second leaf node. The second leaf node receiving the probe packet then returns a response packet to the first leaf node sending the probe packet. The first leaf node calculates a transmission parameter of each path (including multiple physical links included in the path) according to the response packet that is received by the first leaf node through each path. Finally, the first leaf node then allocates to-be-transmitted service traffic to physical links of the first leaf node according to the calculated transmission parameter of each path. According to the service traffic allocation method provided in this embodiment of the present disclosure, a leaf node may detect transmission parameters of all paths between the leaf node and another leaf node by sending a probe packet. Therefore, the leaf node then allocates to-be-transmitted service traffic according to the transmission parameters of the paths. This not only can ensure that service traffic on physical links of the leaf node is balanced, but also can ensure that service traffic on other physical links on each of the paths is balanced, thereby ensuring that service traffic on paths between a source node (for example, the first leaf node) and a destination node (for example, the second leaf node) is balanced, and further ensuring that a packet is not lost.

Figure 3A:
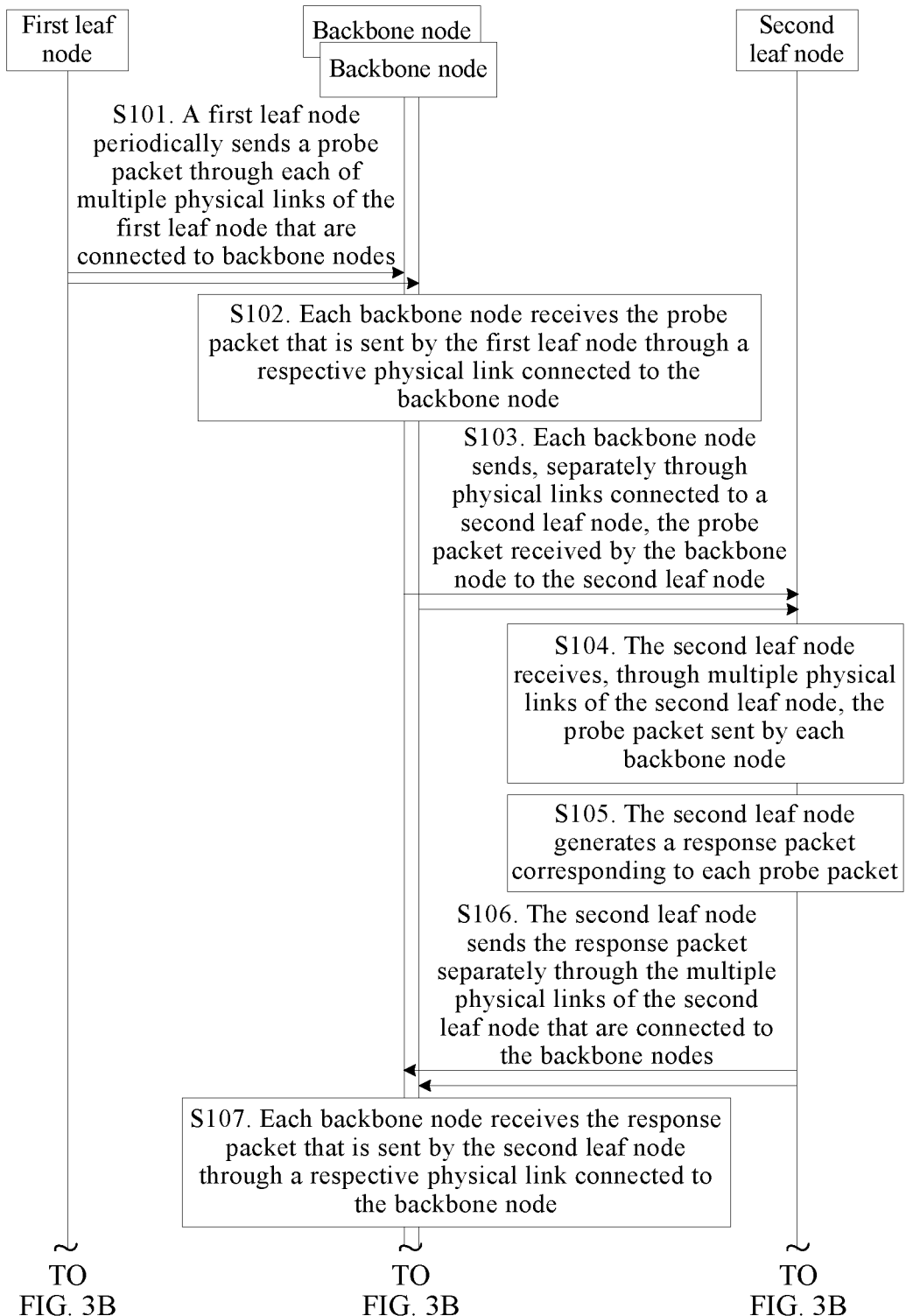
FIG. 3A and FIG. 3B are a schematic diagram of a service traffic allocation method according to an embodiment of the present disclosure.
Figure 3B:
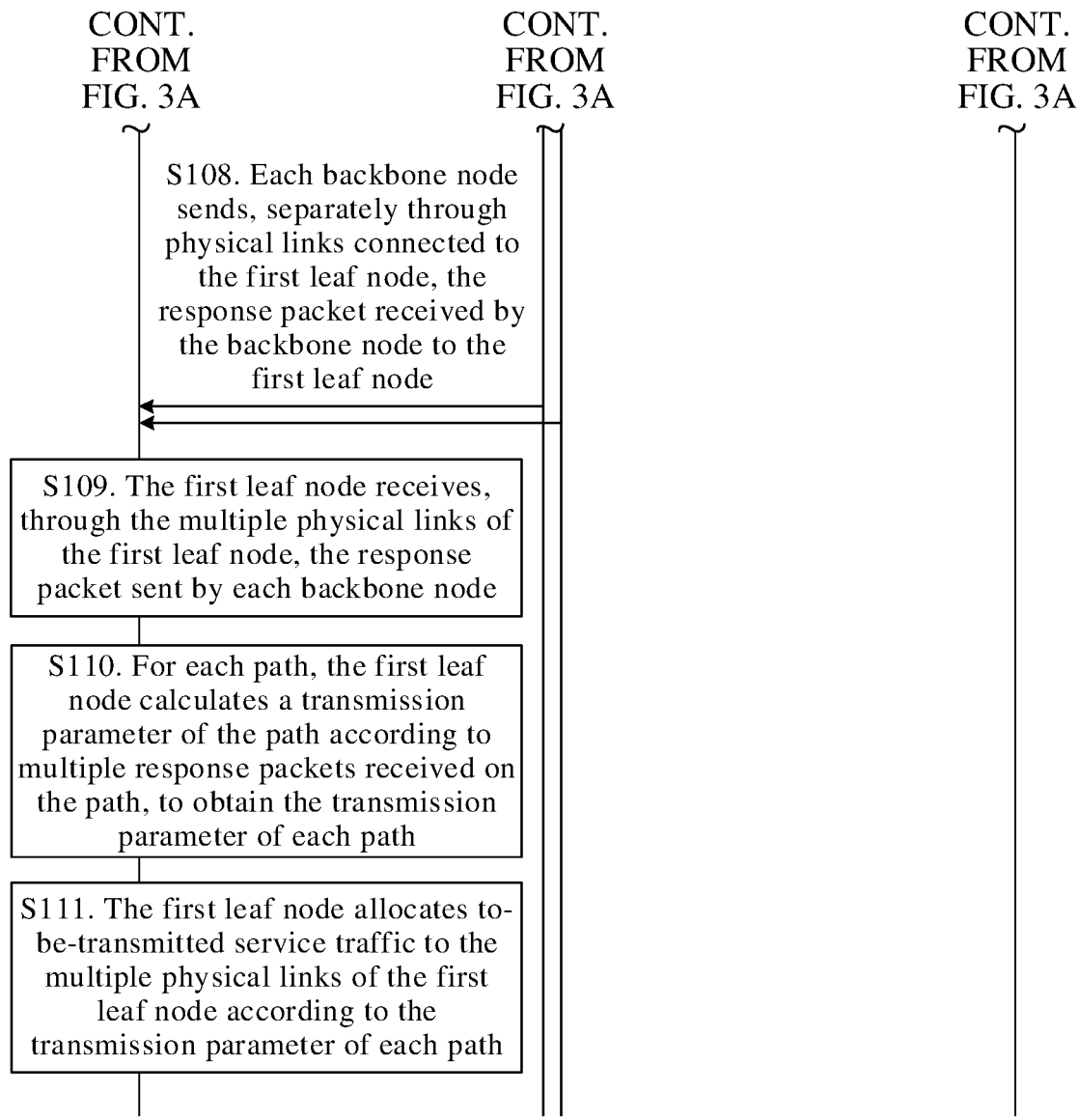

Based on the data center network having a layer 2 leaf-spine topology architecture shown in FIG. 2, an embodiment of the present disclosure provides a service traffic allocation method. As shown in FIG. 3A and FIG. 3B, the service traffic allocation method may include the following steps.

Step S101. A first leaf node repeatedly sends a probe packet through each of multiple physical links of the first leaf node that are connected to backbone nodes.

The multiple physical links of the first leaf node include a physical link between the first leaf node and each of at least one backbone node. For example, the multiple physical links of the first leaf node may include the physical link ①, the physical link ②, the physical link ③, and the physical link ④ shown in FIG. 2, and the first leaf node sends the probe packet separately through the physical link ①, the physical link ②, the physical link ③, and the physical link ④ in each sending period, that is, the probe packet has been sent four times.

For example, in this embodiment of the present disclosure, the first leaf node may be the leaf node 12 in the data center network shown in FIG. 2, and the at least one backbone node may be the backbone node 14 and the backbone node 15 in the data center network shown in FIG. 2.

In this embodiment of the present disclosure, the probe packet may be a packet supporting the virtual extensible local area network (VXLAN) protocol. A specific format of the packet is the same as a format of a VXLAN protocol packet in the other approaches, and details are not described in this embodiment of the present disclosure.

Optionally, to distinguish the probe packet in this embodiment of the present disclosure from a probe packet usually having another function, in this embodiment of the present disclosure, a flag may be set in the probe packet to indicate that the probe packet is used to detect a transmission parameter of a path between a source node and a destination node. The flag may be set according to an actual use requirement. This is not limited in the present disclosure.

Step S102. Each backbone node receives the probe packet that is sent by the first leaf node through a respective physical link connected to the backbone node.

Step S103. Each backbone node sends, separately through physical links connected to a second leaf node, the probe packet received by the backbone node to the second leaf node.

For example, in this embodiment of the present disclosure, the second leaf node may be the leaf node 13 in the data center network shown in FIG. 2.

In this embodiment of the present disclosure, there may be multiple physical links between each backbone node and the second leaf node. Therefore, to enable service traffic on the multiple physical links to be balanced, when sending the probe packet received by the backbone node to the second leaf node, the backbone node may perform sending using a symmetrical hash service traffic allocation method (also referred to as a harsh load sharing method). The first leaf node may calculate, using a hash algorithm and according to all paths that are between the first leaf node and the second leaf node and that are traversed by the first leaf node, a hash value corresponding to each path. Each hash value may be used to represent a physical link between the backbone node and the second leaf node. After the backbone node receives the probe packet sent by the first leaf node, the backbone node may determine, according to a forwarding table (including a correspondence between the hash value and the physical link between the backbone node and the second leaf node) stored in the backbone node, a physical link corresponding to the hash value included in the probe packet, and send the probe packet from an outbound interface of the physical link.

Step S104. The second leaf node receives, through multiple physical links of the second leaf node, the probe packet sent by each backbone node.

The multiple physical links of the second leaf node include a physical link between the second leaf node and each of at least one backbone node. For example, the multiple physical links of the second leaf node may include the physical link ⑤, the physical link ⑥, the physical link ⑦, and the physical link ⑧ shown in FIG. 2.

Step S105. The second leaf node generates a response packet corresponding to each probe packet.

A method for generating, by the second leaf node according to a probe packet received by the second leaf node, a response packet corresponding to the probe packet may be as follows.

After receiving a probe packet, the second leaf node may transpose a source media access control (MAC) address and a destination MAC address in the probe packet, to generate the response packet corresponding to the probe packet.

Alternatively, the second leaf node may transpose a source MAC address and a destination MAC address in the probe packet, transpose a source IP address and a destination IP address in the probe packet, and transpose a layer 4 source port number and a layer 4 destination port number in the probe packet, to generate the response packet corresponding to the probe packet.

Alternatively, the second leaf node may transpose a source MAC address and a destination MAC address in the probe packet, and transpose a source device identifier and a destination device identifier in the probe packet, to generate the response packet corresponding to the probe packet.

A person skilled in the art may understand that except the foregoing fields in the probe packet that are transposed by the second leaf node, another field/a value of another field may be retained in the response packet without any modification. That is, except the fields in the response packet that are transposed by the second leaf node, another field/a value of another field is the same as that of the probe packet.

Optionally, in an embodiment of the present disclosure, the first leaf node and the second leaf node may belong to different virtual local area networks (VLAN), broadcast domains, or IP network segments. Therefore, networks between a leaf node (including the first leaf node and the second leaf node) and a backbone node that interacts with the leaf node may be different. As a result, methods for generating, by the second leaf node according to a probe packet received by the second leaf node, a response packet corresponding to the probe packet may be different. If the first leaf node and the second leaf node belong to a same VLAN, broadcast domain, or IP network segment, a network between the leaf node and the backbone node that interacts with the leaf node is a layer 2 network or a Transparent Interconnection of Lots of Links (TRILL) network. If the first leaf node and the second leaf node belong to different VLANs, broadcast domains, or IP network segments, a network between the leaf node and the backbone node that interacts with the leaf node is a layer 3 network. The following uses an example in which the network between the leaf node and the backbone node is separately these three types of networks, to describe in detail the method for generating, by the second leaf node according to a probe packet received by the second leaf node, a response packet corresponding to the probe packet.

(1) The network between the leaf node and the backbone node is a layer 2 network.

If the network between the leaf node and the backbone node is a layer 2 network, because the layer 2 network is not related to an IP address, when the second leaf node generates, according to a probe packet received by the second leaf node, a response packet corresponding to the probe packet, the second leaf node transposes a source MAC address and a destination MAC address in the probe packet.

(2) The network between the leaf node and the backbone node is a layer 3 network.

If the network between the leaf node and the backbone node is a layer 3 network, when the second leaf node generates, according to a probe packet received by the second leaf node, a response packet corresponding to the probe packet, the second leaf node transposes a source MAC address and a destination MAC address in the probe packet, transposes a source IP address and a destination IP address in the probe packet, and transposes a layer 4 source port number and a layer 4 destination port number in the probe packet.

(3) The network between the leaf node and the backbone node is a TRILL network.

If the network between the leaf node and the backbone node is a TRILL network, when the second leaf node generates, according to a probe packet received by the second leaf node, a response packet corresponding to the probe packet, the second leaf node transposes a source MAC address and a destination MAC address in the probe packet, and transposes a source device identifier and a destination device identifier in the probe packet.

Optionally, in an embodiment of the present disclosure, in addition to the foregoing three types of networks listed above, the network between the leaf node and the backbone node may be a cluster system network, a virtual private local area network service (VPLS) network, a VXLAN, a Network Virtualization using Generic Routing Encapsulation (NVGRE) network, a stateless transport tunneling (STT) network, or the like. Details are not described in this embodiment one by one.

In this embodiment of the present disclosure, the response packet may be a packet supporting the VXLAN protocol. A specific format of the packet is the same as that of a packet supporting the VXLAN protocol in the other approaches.

Further, the following describes, in detail, addresses, port numbers, and the like of the probe packet and the response packet. FIG. 2 is used as an example. It is assumed that the probe packet is transmitted from the leaf node 12 to the backbone node 14 through the physical link ①, and then is transmitted to the leaf node 13 through the physical link ⑤ or the physical link ⑥, and the response packet is returned according to the original path. For the probe packet from the leaf node 12 to the backbone node 14, the source MAC address in the probe packet is a MAC address of the leaf node 12, and the destination MAC address is a MAC address of the backbone node 14, the source IP address is an IP address of the leaf node 12, and the destination IP address is an IP address of the leaf node 13, and the layer 4 source port number is a layer 4 source port number of the leaf node 12, and the layer 4 destination port number is a layer 4 destination port number of the leaf node 13. For the probe packet from the backbone node 14 to the leaf node 13, the source MAC address in the probe packet is the MAC address of the backbone node 14, and the destination MAC address is a MAC address of the leaf node 13, and the source IP address, the destination IP address, the layer 4 source port number, and the layer 4 destination port number are the same as the source IP address, the destination IP address, the layer 4 source port number, and the layer 4 destination port number in the probe packet from the leaf node 12 to the backbone node 14.

It should be noted that the probe packet further includes a time to live (TTL) field. When the probe packet is forwarded on a layer 3 network, a TTL value in the TTL field decreases by 1 each time the probe packet is forwarded. Accordingly, a value of an IP header checksum field in the probe packet and a value of a cyclic redundancy check (CRC) field in the probe packet are synchronously updated.

Accordingly, a person skilled in the art should know that a source MAC address and a destination MAC address of the response packet corresponding to the probe packet are opposite to the source MAC address and the destination MAC address of the probe packet, a source IP address and a destination IP address of the response packet are opposite to the source IP address and the destination IP address of the probe packet, and a layer 4 source port number and a layer 4 destination port number of the response packet are opposite to the layer 4 source port number and the layer 4 destination port number of the probe packet.

Step S106. The second leaf node sends the response packet separately through the multiple physical links of the second leaf node that are connected to the backbone nodes.

In this embodiment of the present disclosure, after the second leaf node generates, according to the probe packet received by the second leaf node, the response packet corresponding to the probe packet, the second leaf node may send the response packet from a layer 4 port for receiving the probe packet. That is, it is ensured that the response packet can be returned to the first leaf node according to the transmission path of the probe packet. In this way, it can be ensured that the first leaf node can accurately calculate a transmission parameter of each path between the first leaf node and the second leaf node.

Step S107. Each backbone node receives the response packet that is sent by the second leaf node through a respective physical link connected to the backbone node.

Step S108. Each backbone node sends, separately through physical links connected to the first leaf node, the response packet received by the backbone node to the first leaf node.

In step S108, similar to step S103, when sending the response packet received by each backbone node to the first leaf node, each of the at least one backbone node may perform sending using a symmetrical hash service traffic allocation method. That is, when the backbone node receives the probe packet sent by the first leaf node, the backbone node records a physical link through which the probe packet is received. Then, the backbone node sends, according to physical links for transmitting probe packets corresponding to response packets, the multiple response packets received by the backbone node to the first leaf node (that is, each response packet is returned to the first leaf node according to an original transmission path of a probe packet corresponding to the response packet). In this way, it can be ensured that a probe packet and a response packet corresponding to the probe packet are transmitted on a same path. Therefore, accuracy of calculating, by the first leaf node, the transmission parameter of each path between the first leaf node and the second leaf node can be improved.

Step S109. The first leaf node receives, through the multiple physical links of the first leaf node, the response packet sent by each backbone node.

Step S110. For each path, the first leaf node calculates a transmission parameter of the path according to multiple response packets received on the path to obtain the transmission parameter of each path.

Response packets received on a same path include a same path identifier. The multiple physical links of the first leaf node belong to different paths, and the multiple physical links of the second leaf node also belong to different paths. One physical link of the first leaf node and one physical link of the second leaf node belong to a same path. For example, based on the data center network shown in FIG. 2, one physical link of the first leaf node (for example, the leaf node 12) and one physical link of the second leaf node (for example, the leaf node 13) form one path.

Optionally, in an embodiment of the present disclosure, the transmission parameter of each path may include at least one of latency of the path, jitter of the path, or a packet loss rate of the path. For example, there are a total of eight paths between the leaf node 12 and the leaf node 13 shown in FIG. 2, which are the path 1 to the path 8 that are described above. The first leaf node may calculate the transmission parameter of each path according to the response packet received on each of the eight paths. The first leaf node may calculate a transmission parameter of the path 1 according to a response packet that is received on the path 1 by the first leaf node, calculate a transmission parameter of the path 2 according to a response packet that is received on the path 2 by the first leaf node, . . . , and calculate a transmission parameter of the path 8 according to a response packet that is received on the path 8 by the first leaf node. In this way, the first leaf node may obtain the transmission parameters of the eight paths.

Step S111. The first leaf node allocates to-be-transmitted service traffic to the multiple physical links of the first leaf node according to the transmission parameter of each path.

After the first leaf node calculates the transmission parameter of each path between the first leaf node and the second leaf node, the first leaf node may properly allocate the to-be-transmitted service traffic to the multiple physical links of the first leaf node according to the transmission parameters of the paths.

For example, it is assumed that the transmission parameter of each path includes latency of the path, jitter of the path, and a packet loss rate of the path. After the first leaf node calculates the latency of each path, the jitter of each path, and the packet loss rate of each path, the first leaf node may allocate the to-be-transmitted service traffic to the multiple physical links of the first leaf node according to the latency of each path, the jitter of each path, the packet loss rate of each path, and an actual transmission requirement of the to-be-transmitted service traffic.

For example, it is assumed that there are four paths between the first leaf node and the second leaf node, which are respectively a path 1, a path 2, a path 3, and a path 4. Transmission parameters of the path 1 are respectively latency 1, jitter 1, and a packet loss rate 1. Transmission parameters of the path 2 are respectively latency 2, jitter 2, and a packet loss rate 2. Transmission parameters of the path 3 are respectively latency 3, jitter 3, and a packet loss rate 3. Transmission parameters of the path 4 are respectively latency 4, jitter 4, and a packet loss rate 4. The latency 1 and the latency 2 are greater than a preset latency threshold, and the latency 3 and the latency 4 are less than the latency threshold. The jitter 1 is greater than a preset jitter threshold, and the jitter 2, the jitter 3, and the jitter 4 are less than the jitter threshold. The packet loss rate 1, the packet loss rate 2, and the packet loss rate 4 are less than a preset packet loss rate threshold, and the packet loss rate 3 is greater than the packet loss rate threshold. When a to-be-transmitted service has a relatively high requirement on a packet loss rate (that is, requires the packet loss rate to be less than the preset packet loss rate threshold), the first leaf node may allocate the to-be-transmitted service traffic to the path 1, the path 2, and the path 4 for transmission (the first leaf node may allocate the to-be-transmitted service traffic to physical links that respectively belong to the path 1, the path 2, and the path 4 on the first leaf node for transmission).

The foregoing latency threshold, jitter threshold, and packet loss rate threshold are determined according to an actual network architecture and network transmission environment, and may be set during actual application.

According to the service traffic allocation method provided in this embodiment of the present disclosure, the first leaf node repeatedly sends the probe packet through each of the multiple physical links of the first leaf node that are connected to a backbone node, for each physical link, the first leaf node receives a returned response packet through the physical link, where each response packet is returned by the second leaf node after a probe packet that is sent through the physical link arrives at the second leaf node, then, for each path, the first leaf node calculates a transmission parameter of the path according to multiple response packets received on the path, to obtain the transmission parameter of each path, and finally, the first leaf node allocates the to-be-transmitted service traffic to the multiple physical links according to the transmission parameter of each path. According to the service traffic allocation method provided in this embodiment of the present disclosure, the first leaf node may detect transmission parameters of all paths between the first leaf node and the second leaf node by sending the probe packet. Therefore, the first leaf node then allocates the to-be-transmitted service traffic according to the transmission parameters of the paths. This not only can ensure that service traffic on the physical links of the first leaf node is balanced, but also can ensure that service traffic on other physical links on each of the paths is balanced, thereby ensuring that service traffic on paths between a source node (for example, the first leaf node) and a destination node (for example, the second leaf node) is balanced, and further ensuring that a packet is not lost.

Optionally, with reference to FIG. 3A and FIG. 3B, in the service traffic allocation method provided in this embodiment of the present disclosure, step S111 may include determining, by the first leaf node, a service traffic allocation ratio of each path according to the transmission parameter of each path, and allocating, by the first leaf node, the to-be-transmitted service traffic to the multiple physical links of the first leaf node according to the service traffic allocation ratio of each path.

In this embodiment of the present disclosure, after the first leaf node calculates the transmission parameter of each path between the first leaf node and the second leaf node, the first leaf node may determine the service traffic allocation ratio of each path according to the transmission parameters of the paths.

For example, it is assumed that the transmission parameter of each path is the packet loss rate. After the first leaf node calculates the packet loss rate of each path, the first leaf node may determine that a path whose packet loss rate is greater than or equal to the preset packet loss rate threshold is relatively congested, and a path whose packet loss rate is less than the packet loss rate threshold is relatively idle. In this case, the first leaf node may determine that a service traffic allocation ratio of the path whose packet loss rate is greater than or equal to the packet loss rate threshold is relatively low, and a service traffic allocation ratio of the path whose packet loss rate is less than the packet loss rate threshold is relatively high. For example, it is assumed that there are two paths, which are respectively a path 1 and a path 2. If a packet loss rate of the path 1 is 1%, a packet loss rate of the path 2 is 5%, and the preset packet loss rate threshold is 2%, the first leaf node may determine that a service traffic allocation ratio of the path 1 is 90%, and a service traffic allocation ratio of the path 2 is 10%.

It should be noted that descriptions and examples for the transmission parameter of each path and the service traffic allocation ratio of each path are merely exemplary. That is, according to the service traffic allocation method provided in this embodiment of the present disclosure, selection of and determining on the transmission parameter of each path and the service traffic allocation ratio of each path may be set according to an actual use requirement. This is not limited in the present disclosure.

Further, after the first leaf node determines the service traffic allocation ratio of each path, the first leaf node may allocate the to-be-transmitted service traffic to the multiple physical links of the first leaf node according to the service traffic allocation ratio of each path. The service traffic allocation ratios determined by the first leaf node are service traffic allocation ratios of all the paths between the first leaf node and the second leaf node (each path includes multiple physical links). Therefore, when transmitting the to-be-transmitted service traffic, the first leaf node may allocate corresponding to-be-transmitted service traffic to the multiple physical links of the first leaf node according to the service traffic allocation ratios. In this way, it not only can ensure that service traffic on each physical link of the first leaf node is balanced, but also can ensure that service traffic on other physical links on each of all the paths between the first leaf node and the second leaf node is also balanced, further preventing a packet from being lost during transmission from the first leaf node to the second leaf node.

Optionally, with reference to FIG. 3A and FIG. 3B, according to the service traffic allocation method provided in this embodiment of the present disclosure, after step S109 and before step S110, the service traffic allocation method may further include, for each path, determining, by the first leaf node according to path identifiers included in received response packets, the response packets received on the path to obtain the multiple response packets received on the path.

In this embodiment of the present disclosure, response packets received on a same path include a same path identifier. Therefore, the first leaf node may separately determine, according to path identifiers included in response packets received by the first leaf node, multiple response packets received on each path.

Step S110 may include calculating, by the first leaf node, the transmission parameter of the path according to packet characteristics of the multiple response packets received on the path.

Optionally, in an embodiment of the present disclosure, a packet characteristic of each of the multiple response packets received on the path includes an identifier of the path, a sequence number of the response packet, a source IP address of the response packet, a destination IP address of the response packet, a layer 4 source port number of the response packet, a layer 4 destination port number of the response packet, a time at which the response packet arrives at the first leaf node, and a time at which a probe packet corresponding to the response packet leaves the first leaf node.

A path identifier included in each response packet may be used to identify a path through which the response packet is transmitted. The path identifier may include an interface name of a device (for example, the first leaf node in this embodiment of the present disclosure) sending a probe packet corresponding to the response packet or an interface identifier of the device, and a hash value.

For example, the interface name of the device may be a name of an access switch in the first leaf node, the interface identifier of the device may be an identifier of an access switch in the first leaf node, and the hash value may be used to represent another physical link other than a physical link of a path between the first leaf node and the backbone node. The hash value is calculated, after network deployment is completed, by the first leaf node using a hash algorithm and according to all the paths that are between the first leaf node and the second leaf node and that are traversed by the first leaf node. For details, refer to related description about the hash value in step S103, and details are not described herein again.

That the path identifier includes one hash value is exemplarily described using the data center network having a layer 2 topology architecture shown in FIG. 2 as an example. For a data center network having a layer 3 or layer more-than-3 topology architecture, the path identifier may include multiple hash values. Each hash value corresponds to one physical link of other physical links different from a first physical link (that is, the first physical link through which the probe packet passes) on the path. An implementation principle of the data center network having a layer 3 or layer more-than-3 topology architecture is similar to an implementation principle of the data center network having a layer 2 topology architecture shown in FIG. 2, and details are not described herein again.

A response packet received on a path may be used to determine a transmission parameter of the path. Therefore, the first leaf node may calculate the transmission parameter of the path separately according to the packet characteristics of the multiple response packets that are received on each path and that are determined by the first leaf node. In this way, after performing calculation for each path, the first leaf node may obtain the transmission parameter of each path.

In this embodiment of the present disclosure, the latency may be obtained by the first leaf node by calculating a difference between a time at which a probe packet is sent and a time at which a response packet corresponding to the probe packet is received (the latency may be obtained by subtracting a time at which the probe packet corresponding to the response packet leaves the first leaf node from a time at which the foregoing response packet arrives at the first leaf node). The jitter may be obtained by the first leaf node by dividing a latency difference between two adjacent packets by a sequence number difference between the two packets. The packet loss rate may be obtained by the first leaf node by dividing, by a quantity of probe packets sent by the first leaf node, a difference between the quantity of probe packets that are sent by the first leaf node within a period of time and a quantity of response packets that are received by the first leaf node within the period of time.

To improve calculation precision, the foregoing latency may be alternatively obtained by the first leaf node by calculating an average value of latency within a period of time. The jitter may be alternatively obtained by the first leaf node by calculating an average value of jitter within a period of time.

A person skilled in the art may understand that the time at which the response packet arrives at the first leaf node and the time at which the probe packet corresponding to the response packet leaves the first leaf node that are used by the first leaf node to calculate the latency may be carried in the response packet. For example, when sending the probe packet, the first leaf node may add a timestamp to the probe packet, to indicate the time at which the probe packet leaves the first leaf node. After receiving the response packet, the first leaf node may also add a timestamp to the response packet, to indicate the time at which the response packet arrives at the first leaf node.

Correspondingly, the foregoing latency difference between two adjacent packets that is used by the first leaf node to calculate the jitter may be obtained by performing subtraction on latencies of the two packets. Sequence numbers of the two packets are added by the first leaf node to probe packets when the first leaf node sends the probe packets. The sequence number of each packet is used to uniquely identify the packet, and the sequence number of each packet may be carried in the packet.

Correspondingly, the foregoing quantity of probe packets that are sent by the first leaf node within a period of time and the quantity of response packets that are received by the first leaf node within the period of time that are used by the first leaf node to calculate the packet loss rate may be counted by the first leaf node.

Optionally, in the service traffic allocation method provided in this embodiment of the present disclosure, the determining, by the first leaf node, a service traffic allocation ratio of each path according to the transmission parameter of each path may include quantizing, by the first leaf node, the transmission parameter of each path, and determining, by the first leaf node, the service traffic allocation ratio of each path according to the quantized transmission parameter of each path.

In this embodiment of the present disclosure, for ease of implementation and calculation, after the first leaf node calculates the transmission parameter of each path between the first leaf node and the second leaf node, the first leaf node may first quantize the transmission parameter of each path, and then determine the service traffic allocation ratio of each path according to the quantized transmission parameter of each path.

Optionally, in an embodiment of the present disclosure, there may be multiple implementations in which the first leaf node quantizes the transmission parameter of each path. That the first leaf node quantizes the transmission parameter of each path is exemplarily described in the following using a possible implementation as an example.

It is assumed that the transmission parameter of each path between the first leaf node and the second leaf node includes latency of the path, jitter of the path, and a packet loss rate of the path. A correspondence between latency and a quantized latency value, a correspondence between jitter and a quantized jitter value, and a correspondence between a packet loss rate and a quantized packet loss rate value may be preset. After the first leaf node calculates the transmission parameter of each path, the first leaf node may determine a quantized value of the transmission parameter of each path according to the transmission parameter of each path and the correspondences.

In this embodiment of the present disclosure, the correspondence between latency and a quantized latency value may be represented using the following Table 1, the correspondence between jitter and a quantized jitter value may be represented using the following Table 2, and the correspondence between a packet loss rate and a quantized packet loss rate value may be represented using the following Table 3.

TABLE 1

| Latency (microseconds (µs)) | Quantized latency value |
| --- | --- |
| 0-1.5 | 0 |
| 1.5-3.0 | 1 |
| 3.0-6.0 | 2 |
| 6.0-15.0 | 3 |
| 15.0-30.0 | 4 |
| 30.0-50.0 | 5 |
| 50.0-100.0 | 6 |
| >100.0 | 7 |

For example, referring to Table 1, if the first leaf node obtains, by means of calculation, that latency of a path is 7.0 µs, the first leaf node may quantize the latency into 3.

TABLE 2

| Jitter (µs) | Quantized jitter value |
| --- | --- |
| 0-1.0 | 0 |
| 1.0-2.0 | 1 |
| 2.0-8.0 | 2 |
| 8.0-32.0 | 3 |
| 32.0-128.0 | 4 |
| 128.0-512.0 | 5 |
| 512.0-1024.0 | 6 |
| >1024.0 | 7 |

For example, referring to Table 2, if the first leaf node obtains, by means of calculation, that jitter of a path is 7.0 µs, the first leaf node may quantize the jitter into 2.

TABLE 3

| Packet loss rate ($10^{-6}$) | Quantized packet loss rate value |
| --- | --- |
| <1 | 0 |
| <10 | 1 |
| <100 | 2 |
| <1000 | 3 |
| <10000 | 4 |
| <100000 | 5 |
| <500000 | 6 |
| ≥500000 | 7 |

For example, referring to Table 3, if the first leaf node obtains, by calculation, that a packet loss rate of a path is $10000 \times 10^{-6} = 0.01$ (that is, 1%), the first leaf node may quantize the packet loss rate into 4.

In actual application, the quantized latency value, the quantized jitter value, and the quantized packet loss rate value each may be represented by 3 bits. For example, 0 may be represented by 000, 1 may be represented by 001, 2 may be represented by 010, 3 may be represented by 011, 4 may be represented by 100, 5 may be represented by 101, 6 may be represented by 110, and 7 may be represented by 111.

Further, the method for determining, by the first leaf node, the service traffic allocation ratio of each path according to the quantized transmission parameter of each path may be one of the following.

(1) The first leaf node uses a path as a unit, and adds up the quantized transmission parameters of each path, to obtain a total transmission parameter of each path. Then, the first leaf node determines the service traffic allocation ratio of each path according to the total transmission parameter of each path.

For example, it is assumed that there are three paths, which are respectively a path 1, a path 2, and a path 3. A transmission parameter of each of the three paths includes latency, jitter, and a packet loss rate. A quantized latency value of the path 1 is 2, a quantized jitter value of the path 1 is 5, and a quantized packet loss rate value of the path 1 is 3. A quantized latency value of the path 2 is 5, a quantized jitter value of the path 2 is 2, and a quantized packet loss rate value of the path 2 is 0. A quantized latency value of the path 3 is 3, a quantized jitter value of the path 3 is 0, and a quantized packet loss rate value of the path 3 is 2. The first leaf node may add up the quantized latency value of the path 1, the quantized jitter value of the path 1, and the quantized packet loss rate value of the path 1 to obtain a total transmission parameter (that is, 2+5+3=10) of the path 1, add up the quantized latency value of the path 2, the quantized jitter value of the path 2, and the quantized packet loss rate value of the path 2 to obtain a total transmission parameter (that is, 5+2+0=7) of the path 2, and add up the quantized latency value of the path 3, the quantized jitter value of the path 3, and the quantized packet loss rate value of the path 3 to obtain a total transmission parameter (that is, 3+0+2=5) of the path 3. Then, the first leaf node determines service traffic allocation ratios of the path 1, the path 2, and the path 3 according to the total transmission parameter of the path 1, the total transmission parameter of the path 2, and the total transmission parameter of the path 3. In this way, it can be ensured that service traffic on the path 1, the path 2, and the path 3 can be balanced.

(2) The first leaf node uses a path as a unit, and splices 3 bits of each quantized transmission parameter of each path into one sequence, and a value of the sequence may represent a total transmission parameter of each path. Then, the first leaf node determines the service traffic allocation ratio of each path according to the total transmission parameter of each path.

For example, it is assumed that there are three paths, which are respectively a path 1, a path 2, and a path 3. A transmission parameter of each of the three paths includes latency, jitter, and a packet loss rate. A quantized latency value of the path 1 is 2 (represented by 010), a quantized jitter value of the path 1 is 5 (represented by 101), and a quantized packet loss rate value of the path 1 is 3 (represented by 011). A quantized latency value of the path 2 is 5 (represented by 101), a quantized jitter value of the path 2 is 2 (represented by 010), and a quantized packet loss rate value of the path 2 is 0 (represented by 000). A quantized latency value of the path 3 is 3 (represented by 011), a quantized jitter value of the path 3 is 0 (represented by 000), and a quantized packet loss rate value of the path 3 is 2 (represented by 010). The first leaf node may splice 3 bits of the quantized latency value of the path 1, 3 bits of the quantized jitter value of the path 1, and 3 bits of the quantized packet loss rate value of the path 1 into a sequence, to obtain a total transmission parameter (that is, 010101011=171) of the path 1, splice 3 bits of the quantized latency value of the path 2, 3 bits of the quantized jitter value of the path 2, and 3 bits of the quantized packet loss rate value of the path 2 into a sequence, to obtain a total transmission parameter (that is, 101010000=336) of the path 2, and splice 3 bits of the quantized latency value of the path 3, 3 bits of the quantized jitter value of the path 3, and 3 bits of the quantized packet loss rate value of the path 3 into a sequence to obtain a total transmission parameter (that is, 011000010=200) of the path 3. Then, the first leaf node determines service traffic allocation ratios of the path 1, the path 2, and the path 3 according to the total transmission parameter of the path 1, the total transmission parameter of the path 2, and the total transmission parameter of the path 3. In this way, it can be ensured that service traffic on the path 1, the path 2, and the path 3 can be balanced.

It should be noted that, that the first leaf node determines service traffic allocation ratios of the path 1, the path 2, and the path 3 according to the total transmission parameter of the path 1, the total transmission parameter of the path 2, and the total transmission parameter of the path 3 includes determining, by the first leaf node, the service traffic allocation ratio of the path 1 according to the total transmission parameter of the path 1, the total transmission parameter of the path 2, and the total transmission parameter of the path 3, determining, by the first leaf node, the service traffic allocation ratio of the path 2 according to the total transmission parameter of the path 1, the total transmission parameter of the path 2, and the total transmission parameter of the path 3, and determining, by the first leaf node, the service traffic allocation ratio of the path 3 according to the total transmission parameter of the path 1, the total transmission parameter of the path 2, and the total transmission parameter of the path 3.

That the first leaf node determines service traffic allocation ratios of the path 1, the path 2, and the path 3 according to the total transmission parameter of the path 1, the total transmission parameter of the path 2, and the total transmission parameter of the path 3 may be implemented according to a corresponding algorithm selected according to an actual use requirement. This is not limited in this embodiment of the present disclosure. For example, it is assumed that in (1), the total transmission parameter of the path 1 is 10, the total transmission parameter of the path 2 is 7, and the total transmission parameter of the path 3 is 5. The first leaf node may calculate percentages that 10, 7, and 5 account for, and then determine the service traffic allocation ratios of the path 1, the path 2, and the path 3 according to the percentages. The total transmission parameter of the path 1 is the largest, the total transmission parameter of the path 2 is the second largest, and the total transmission parameter of the path 3 is the smallest. Therefore, the first leaf node may consider that transmission performance of the path 1 is the poorest, transmission performance of the path 2 is the second poorest, and transmission performance of the path 3 is the best. In this way, the first leaf node may determine that the service traffic allocation ratio of the path 1 is the smallest, the service traffic allocation ratio of the path 2 is the second smallest, and the service traffic allocation ratio of the path 3 is the largest. In this way, the transmission performance of each path may be obtained according to the transmission parameters of each path. Therefore, the service traffic allocation ratio of each path is determined according to the transmission parameter of each path. It can be ensured that service traffic on each path is balanced.

Optionally, in an embodiment of the present disclosure, the first leaf node may execute the foregoing service traffic allocation method shown in FIG. 3A and FIG. 3B only once.

When the first leaf node calculates the transmission parameter of each path, a user may configure the transmission parameter of each path in the first leaf node. If the first leaf node needs to transmit a service, the first leaf node may allocate the to-be-transmitted service traffic to the physical links of the first leaf node according to the preconfigured transmission parameter of each path. Alternatively, when the first leaf node determines the service traffic allocation ratio of each path according to the transmission parameter of each path, a user may configure the service traffic allocation ratio of each path in the first leaf node. If the first leaf node needs to transmit a service, the first leaf node may allocate the to-be-transmitted service traffic to the physical links of the first leaf node according to the preconfigured service traffic allocation ratio of each path. In this way, it can also be ensured that service traffic on each path between the first leaf node and the second leaf node is balanced, further ensuring that a packet is not lost.

It should be noted that, that the first leaf node executes the foregoing service traffic allocation method shown in FIG. 3A and FIG. 3B only once is applicable only to an application scenario in which an architecture of a data center network is basically fixed and has no relatively major change (that is, after deployment of the data center network is completed, the architecture of the data center network has no relatively major change).

Optionally, for an application scenario in which an architecture of a data center network dynamically changes, the first leaf node may repeat the foregoing service traffic allocation method shown in FIG. 3A and FIG. 3B. The first leaf node may continuously repeat the foregoing service traffic allocation method shown in FIG. 3A and FIG. 3B, or the first leaf node may repeat the foregoing service traffic allocation method shown in FIG. 3A and FIG. 3B at a fixed period. This may be set according to an actual use requirement, and is not limited in the present disclosure.

According to the service traffic allocation method provided in this embodiment of the present disclosure, the first leaf node may detect transmission parameters of all paths between the first leaf node and the second leaf node by sending the probe packet. Therefore, the first leaf node allocates the to-be-transmitted service traffic according to the transmission parameters of the paths. This not only can ensure that service traffic on the physical links of the first leaf node is balanced, but also can ensure that service traffic on other physical links on each of the paths is balanced, thereby ensuring that service traffic on paths between a source node (for example, the first leaf node) and a destination node (for example, the second leaf node) is balanced, and further ensuring that a packet is not lost.

Figure 4:
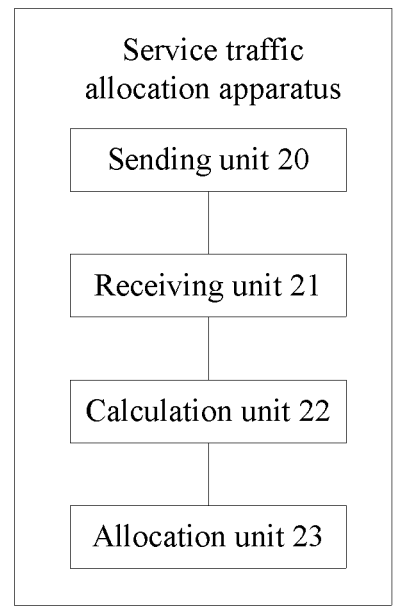
FIG. 4 is a first schematic structural diagram of a service traffic allocation apparatus according to an embodiment of the present disclosure.

As shown in FIG. 4, an embodiment of the present disclosure provides a service traffic allocation apparatus. The allocation apparatus is a first leaf node. The allocation apparatus is configured to perform steps in the foregoing method that are performed by the first leaf node. The allocation apparatus may include modules corresponding to corresponding steps. For example, the allocation apparatus may include a sending unit 20 configured to repeatedly send a probe packet through each of multiple physical links of the first leaf node that are connected to a backbone node, a receiving unit 21 configured to, for each physical link, receive a returned response packet through the physical link, where the response packet is returned by a second leaf node after a probe packet that is sent through a physical link arrives at the second leaf node, a calculation unit 22 configured to, for each path, calculate a transmission parameter of the path according to multiple response packets that are received on the path by the receiving unit 21 to obtain the transmission parameter of each path, where response packets received on a same path include a same path identifier, each path includes at least two physical links, and the multiple physical links belong to different paths, and an allocation unit 23 configured to allocate to-be-transmitted service traffic to the multiple physical links according to the transmission parameter of each path that is calculated by the calculation unit 22.

Optionally, the allocation unit 23 is configured to determine a service traffic allocation ratio of each path according to the transmission parameter of each path that is calculated by the calculation unit 22, and allocate the to-be-transmitted service traffic to the multiple physical links according to the service traffic allocation ratio of each path.

Optionally, the transmission parameter of the path includes at least one of latency of the path, jitter of the path, or a packet loss rate of the path.

Figure 5:
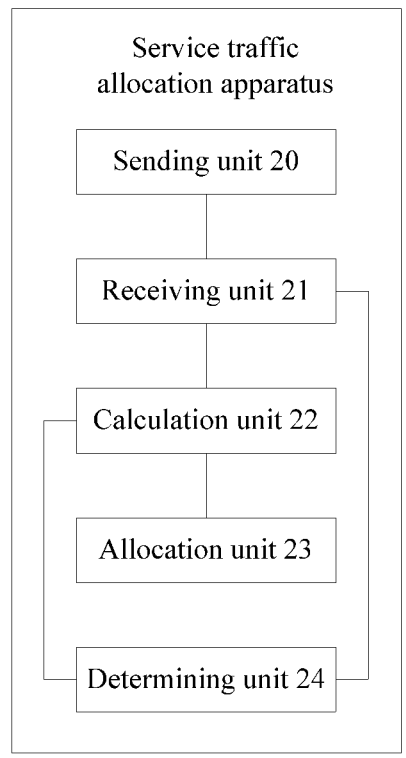
FIG. 5 is a second schematic structural diagram of a service traffic allocation apparatus according to an embodiment of the present disclosure.

Optionally, with reference to FIG. 4, as shown in FIG. 5, the allocation apparatus further includes a determining unit 24.

The determining unit 24 is configured to, before the calculation unit 22 calculates the transmission parameter of the path according to the multiple response packets received on the path, determine, according to path identifiers included in response packets received by the receiving unit 21, the response packets received on the path to obtain the multiple response packets received on the path. The calculation unit 22 is configured to calculate the transmission parameter of the path according to packet characteristics of the multiple response packets that are received on the path and that are determined by the determining unit 24.

Optionally, a packet characteristic of each of the multiple response packets that are received on the path by the receiving unit 21 includes an identifier of the path, a sequence number of the response packet, a source IP address of the response packet, a destination IP address of the response packet, a layer 4 source port number of the response packet, a layer 4 destination port number of the response packet, a time at which the response packet arrives at the first leaf node, and a time at which a probe packet corresponding to the response packet leaves the first leaf node.

Optionally, the allocation unit 23 is configured to quantize the transmission parameter of each path that is calculated by the calculation unit 22, and determine the service traffic allocation ratio of each path according to the quantized transmission parameter of each path.

In this embodiment of the present disclosure, the allocation apparatus/the first leaf node may be a switch, and the second leaf node and the backbone node may also be switches. The first leaf node and the second leaf node may serve as leaf switches in a data center network having a layer 2 leaf-spine topology architecture, and the backbone node may be a backbone switch in the data center network having a layer 2 leaf-spine topology architecture.

It may be understood that the allocation apparatus in this embodiment may correspond to the first leaf node in the service traffic allocation method in the embodiment shown in FIG. 3A and FIG. 3B, and division and/or functions of the modules in the allocation apparatus in this embodiment are designed to implement the method procedure shown in FIG. 3A and FIG. 3B. For brevity, details are not described herein again.

This embodiment of the present disclosure provides a service traffic allocation apparatus. The allocation apparatus is the first leaf node, and the first leaf node may detect transmission parameters of all paths between the first leaf node and the second leaf node by sending the probe packet. Therefore, the first leaf node then allocates the to-be-transmitted service traffic according to the transmission parameters of the paths. This not only can ensure that service traffic on the physical links of the first leaf node is balanced, but also can ensure that service traffic on other physical links on each of the paths is balanced, thereby ensuring that service traffic on paths between a source node (for example, the first leaf node) and a destination node (for example, the second leaf node) is balanced, and further ensuring that a packet is not lost.

Figure 6:
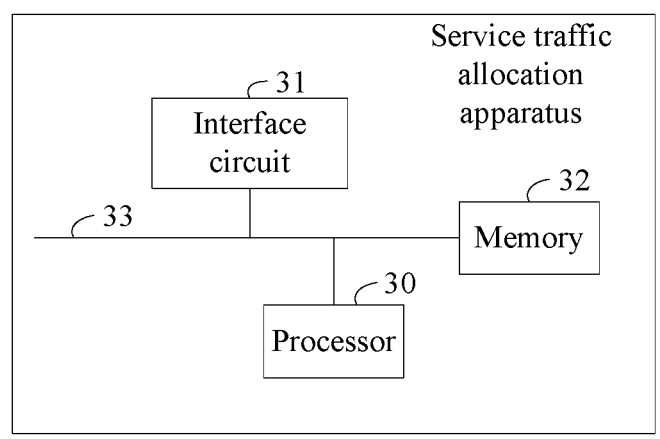
FIG. 6 is a schematic hardware diagram of a service traffic allocation apparatus according to an embodiment of the present disclosure.

As shown in FIG. 6, an embodiment of the present disclosure provides a service traffic allocation apparatus. The allocation apparatus is a first leaf node. The first leaf node is a switch (the switch may serve as a leaf switch in a data center network having a layer 2 leaf-spine topology architecture). The switch includes a processor 30, an interface circuit 31, a memory 32, and a system bus 33.

The memory 32 is configured to store a computer program instruction. The processor 30, the interface circuit 31, and the memory 32 are connected to each other using the system bus 33. When the switch runs, the processor 30 executes the computer program instruction stored in the memory 32 such that the switch executes the service traffic allocation method shown in FIG. 3A and FIG. 3B. For a specific service traffic allocation method, refer to related descriptions in the embodiment shown in FIG. 3A and FIG. 3B, and details are not described herein again.

This embodiment further provides a storage medium. The storage medium may include the memory 32.

The processor 30 may be a central processing unit (CPU). The processor 30 may alternatively be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, or the processor may be any conventional processor or the like.

The processor 30 may be a dedicated processor. The dedicated processor may include at least one of a baseband processing chip, a radio frequency processing chip, or the like. Further, the dedicated processor may further include a chip having another dedicated processing function of the switch.

The memory 32 may include a volatile memory, for example a random-access memory (RAM). The memory 32 may include a non-volatile memory, for example, a read-only memory (ROM), a flash memory, a hard disk drive (HDD), or a solid-state drive (SSD). The memory 32 may further include a combination of the foregoing types of memories.

The system bus 33 may include a data bus, a power bus, a control bus, a status signal bus, and the like. In this embodiment, for a clear description, various buses are shown as the system bus 33 in FIG. 6.

The interface circuit 31 may be a transceiver on the switch. The transceiver may be a wireless transceiver. The processor 30 sends a packet to or receives a packet from another device, for example, another switch, using the interface circuit 31.

In a specific implementation process, steps in the foregoing method procedure shown in FIG. 3A and FIG. 3B may be implemented by the hardware-form processor 30 by executing the software-form computer program instruction stored in the memory 32. To avoid repetition, details are not described herein again.

In this embodiment of the present disclosure, a second leaf node and a backbone node may also be switches. The second leaf node may serve as a leaf switch in a data center network having a layer 2 leaf-spine topology architecture, and the backbone node may be a backbone switch in the data center network having a layer 2 leaf-spine topology architecture.

This embodiment of the present disclosure provides a service traffic allocation apparatus. The allocation apparatus is the first leaf node, the first leaf node is the switch, and the switch may detect transmission parameters of all paths between the switch and another switch by sending a probe packet. Therefore, the switch then allocates to-be-transmitted service traffic according to the transmission parameters of the paths. This not only can ensure that service traffic on physical links of the switch is balanced, but also can ensure that service traffic on other physical links on each of the paths is balanced, thereby ensuring that service traffic on paths between the switch and another switch is balanced, and further ensuring that a packet is not lost.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The foregoing integrated unit may be implemented in a form of a software function unit.

When the integrated unit is implemented in the form of a software functional unit and sold or used as an independent product, the integrated unit may be stored in a computer-readable storage medium. Based on such an understanding, all or some of the technical solutions may be implemented in a form of a software product. The software product is stored in a storage medium, and includes instructions for instructing a computer device (which may be a personal computer, a server, or a network device) to perform all or some of the steps of the methods described in the embodiments of the present disclosure. The storage medium is a non-transitory medium, including various media that can store program code, such as a flash memory, a removable hard disk, a read-only memory, a random access memory, a diskette, or a compact disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A service traffic allocation method, comprising:
   repeatedly sending, by a first leaf node, a probe packet through multiple paths between the first leaf node and a second leaf node, wherein the first leaf node includes a first pair of switches and the second leaf node includes a second pair of switches, wherein each of the multiple paths comprises a first physical link in multiple first physical links of the first leaf node and a second physical link in multiple second physical links of the second leaf node, and wherein each of the multiple first physical links and the multiple second physical links are coupled to a backbone node;
   receiving, by the first leaf node, a response packet through each first physical link in the multiple paths, each response packet being returned from the second leaf node after each probe packet arrives at the second leaf node through each second physical link in the multiple paths;
   calculating, by the first leaf node, a transmission parameter of each of the multiple paths according to each response packet received on at least the first and second physical links in each of the multiple paths, response packets received on a same path comprising a same path identifier, each path comprising at least two physical links corresponding to the first physical link of the first leaf node and the second physical link of the second leaf node, and each of the first physical links of the first leaf node belonging to different paths in the multiple paths; and
   allocating, by the first leaf node, to-be-transmitted service traffic to the first physical links of the first leaf node according to the transmission parameter of each path.

2. The service traffic allocation method of claim 1, wherein allocating the to-be-transmitted service traffic to the first physical links of the first leaf node comprises:
   determining, by the first leaf node, a service traffic allocation ratio of each path according to the transmission parameter of each path; and
   allocating, by the first leaf node, the to-be-transmitted service traffic to the first physical links of the first leaf node according to the service traffic allocation ratio of each path.

3. The service traffic allocation method of claim 2, wherein determining the service traffic allocation ratio of each path comprises:
   quantizing, by the first leaf node, the transmission parameter of each path; and
   determining, by the first leaf node, the service traffic allocation ratio of each path according to the quantized transmission parameter of each path.

4. The service traffic allocation method of claim 1, wherein the transmission parameter of each path comprises latency of the corresponding path.

5. The service traffic allocation method of claim 1, wherein the transmission parameter of each path comprises jitter of the corresponding path.

6. The service traffic allocation method of claim 1, wherein the transmission parameter of each path comprises a packet loss rate of the corresponding path.

7. The service traffic allocation method according to claim 1, wherein before calculating the transmission parameter of each path, the method further comprises determining, by the first leaf node according to path identifiers comprised in received response packets, the response packets received on the corresponding path to obtain the response packets received on the corresponding path, and calculating the transmission parameter of each path comprising calculating, by the first leaf node, the transmission parameter of each path according to packet characteristics of the response packets received on the corresponding path.

8. The service traffic allocation method of claim 7, wherein a packet characteristic of each of the response packets received on the corresponding path comprises:
   an identifier of the corresponding path;
   a sequence number of the response packet;
   a source Internet Protocol (IP) address of the response packet;
   a destination IP address of the response packet;
   a layer 4 source port number of the response packet;
   a layer 4 destination port number of the response packet;
   a time at which the response packet arrives at the first leaf node; and
   a time at which a probe packet corresponding to the response packet left the first leaf node.

9. A service traffic allocation apparatus, applied to a first leaf node comprising a switch, the allocation apparatus comprising:
   a memory configured to store a computer program instruction; and
   a processor coupled to the memory, the computer program instruction causing the processor to be configured to:
      repeatedly send a probe packet through multiple paths between the first leaf node and a second leaf node, wherein the first leaf node includes a first pair of switches and the second leaf node includes a second pair of switches, wherein each of the multiple paths comprises a first physical link in multiple first physical links of the first leaf node and a second physical link in multiple second physical links of the second leaf node, and wherein each of the multiple first physical links and the multiple second physical links are coupled to a backbone node;
      receive a response packet through each first physical link in the multiple paths, each response packet being returned from the second leaf node after each probe packet arrives at the second leaf node through each second physical link in the multiple paths;
      calculate a transmission parameter of each of the multiple paths according to each response packet received on at least the first and second physical links in each of the multiple paths, response packets received on a same path comprising a same path identifier, each path comprising at least two physical links corresponding to the first physical link of the first leaf node and the second physical link of the second leaf node, and each of the first physical links of the first leaf node belonging to different paths in the multiple paths; and allocate to-be-transmitted service traffic to the first physical links of the first leaf node according to the transmission parameter of each path.

10. The service traffic allocation apparatus of claim 9, wherein in a specific manner of allocating the to-be-transmitted service traffic to the physical links of the first leaf node, the computer program instruction further causes the processor to be configured to:

determine a service traffic allocation ratio of each path according to the transmission parameter of each path; and allocate the to-be-transmitted service traffic to the physical links of the first leaf node according to the service traffic allocation ratio of each path.

11. The service traffic allocation apparatus of claim 10, wherein in a specific manner of determining the service traffic allocation ratio of each path, the computer program instruction further causes the processor to be configured to:

quantize the transmission parameter of each path; and determine the service traffic allocation ratio of each path according to the quantized transmission parameter of each path.

12. The service traffic allocation apparatus of claim 9, wherein the transmission parameter of each path comprises latency of the corresponding path.

13. The service traffic allocation apparatus of claim 9, wherein the transmission parameter of each path comprises jitter of the corresponding path.

14. The service traffic allocation apparatus of claim 9, wherein the transmission parameter of each path comprises a packet loss rate of the corresponding path.

15. The service traffic allocation apparatus of claim 9, wherein before calculating the transmission parameter of each path, the computer program instruction further causes the processor to be configured to determine, according to path identifiers comprised in received response packets, the response packets received on the corresponding path to obtain the response packets received on the corresponding path, and in a specific manner of calculating the transmission parameter of each path, the computer program instruction further causing the processor to be configured to calculate the transmission parameter of each path according to packet characteristics of the response packets received on the corresponding path.

16. The service traffic allocation apparatus of claim 15, wherein a packet characteristic of each of the response packets received on the corresponding path comprises:

an identifier of the corresponding path;

a sequence number of the response packet;

a source Internet Protocol (IP) address of the response packet;

a destination IP address of the response packet;

a layer 4 source port number of the response packet;

a layer 4 destination port number of the response packet;

a time at which the response packet arrives at the first leaf node; and a time at which a probe packet corresponding to the response packet leaves the first leaf node.

* * * * *